US012678907B2

(12) United States Patent
Hoyle et al.

(10) Patent No.: US 12,678,907 B2
(45) Date of Patent: Jul. 14, 2026

(54) METHOD FOR MEASURING NON-TOOTHED TOOLS USING A NON-CONTACT TOOL SETTER

(71) Applicant: RENISHAW PLC, Gloucestershire (GB)

(72) Inventors: Samuel David Hoyle, Bristol (GB); Benjamin Jason Merrifield, Bristol (GB); Stephen Lindsey Tocknell, Stroud (GB); Paul Andrews, Tewkesbury (GB)

(73) Assignee: RENISHAW PLC, Wotton-under-Edge (GB)

( * ) Notice: Subject to any disclaimer, the term of this patent is extended or adjusted under 35 U.S.C. 154(b) by 771 days.

(21) Appl. No.: 18/246,776

(22) PCT Filed: Oct. 6, 2021

(86) PCT No.: PCT/GB2021/052575
§ 371 (c)(1),
(2) Date: Mar. 27, 2023

(87) PCT Pub. No.: WO2022/074381
PCT Pub. Date: Apr. 14, 2022

(65) Prior Publication Data
US 2023/0286099 A1      Sep. 14, 2023

(30) Foreign Application Priority Data
Oct. 9, 2020     (GB) ..................................... 2016009

(51) Int. Cl.
*B23Q 17/24*      (2006.01)
*B24B 49/12*      (2006.01)
*G01B 11/02*      (2006.01)

(52) U.S. Cl.
CPC ..... *B23Q 17/2457* (2013.01); *B23Q 17/2485* (2013.01); *B24B 49/12* (2013.01); *G01B 11/02* (2013.01); *B23Q 2717/00* (2013.01)

(58) Field of Classification Search
CPC ............ B23Q 17/2457; B23Q 17/2485; B23Q 2717/00; B24B 49/12; G01B 11/02; G01B 11/04
See application file for complete search history.

(56) References Cited

U.S. PATENT DOCUMENTS

| | | | | | |
|---|---|---|---|---|---|
| 4,775,236 A | * | 10/1988 | Cohen | .................... | G01B 11/02 |
| | | | | | 356/640 |
| 6,496,273 B1 | | 12/2002 | Stimpson et al. | | |

(Continued)

FOREIGN PATENT DOCUMENTS

| | | |
|---|---|---|
| CN | 1338040 A | 2/2002 |
| CN | 102549451 A | 7/2012 |

(Continued)

OTHER PUBLICATIONS

Dec. 22, 2021 International Search Report issued in Patent Application No. PCT/GB2021/052575.

(Continued)

*Primary Examiner* — David J Bolduc
(74) *Attorney, Agent, or Firm* — Oliff PLC

(57) ABSTRACT

An improved method is described for measuring a dimension (e.g. diameter) of a non-toothed tool, for example a grinding tool such as a diamond coated burr. The method may be implemented on a machine tool, such as a lathe, machining centre or the like. The method comprises passing a beam of light from a transmitter to a receiver. The receiver produces a received intensity signal related to the intensity of received light. Analysis of variations in the received intensity signal is performed when a rotating tool is moved relative to the light beam to enable a dimension of the tool (Continued)

Figure 1:
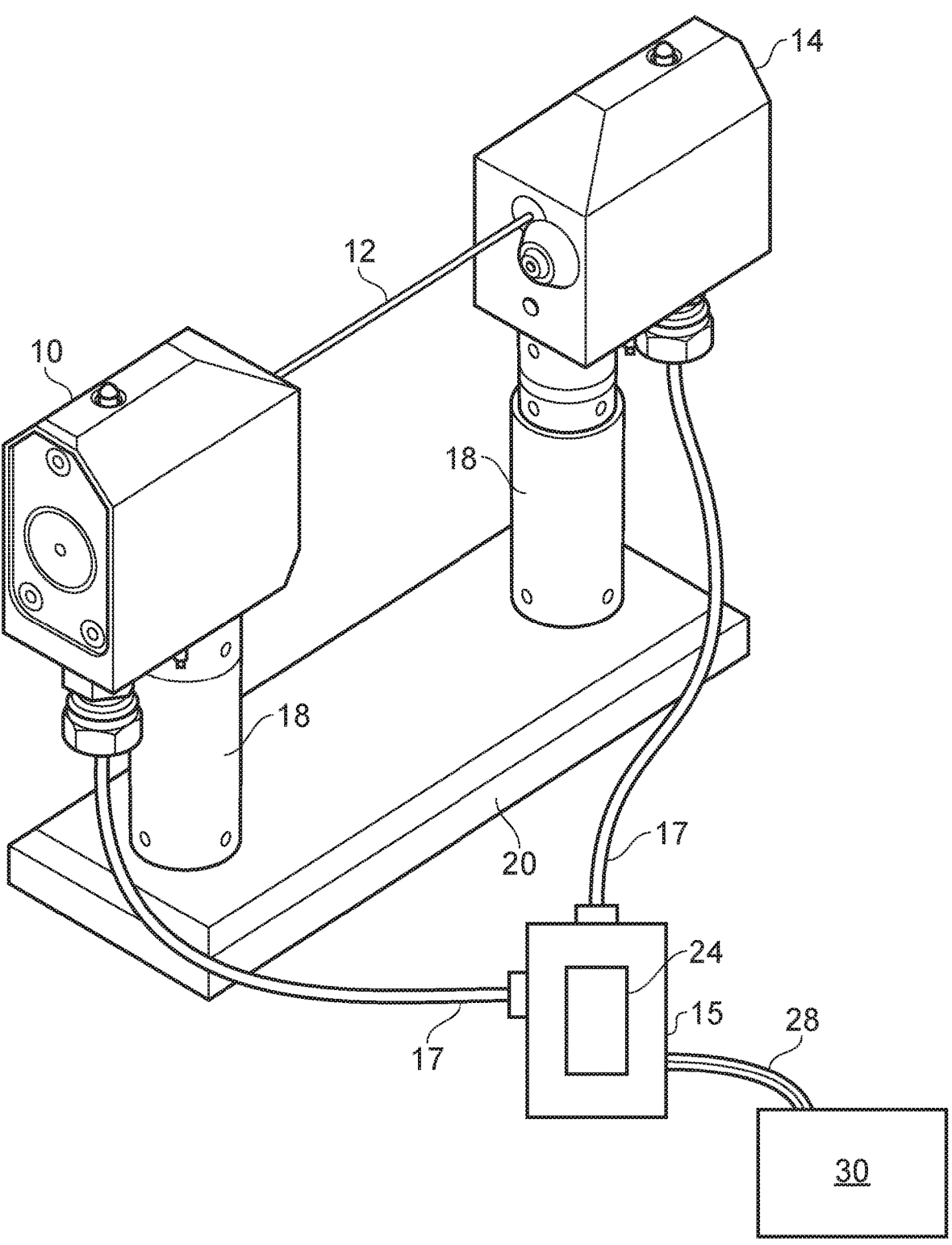

to be measured. In particular, it may be determined when the received intensity signal has crossed a threshold for at least a defined duration, the defined duration being less than the time taken for one complete rotation of the tool.

15 Claims, 4 Drawing Sheets

(56) References Cited

U.S. PATENT DOCUMENTS

| | | | |
|---|---|---|---|
| 6,552,811 B2 | 4/2003 | Hayashi | |
| 6,633,379 B2 | 10/2003 | Roesner et al. | |
| 6,635,894 B1 | 10/2003 | Stimpson et al. | |
| 6,643,562 B2 | 11/2003 | Stimpson et al. | |
| 6,761,615 B2 | 7/2004 | Cohen | |
| 6,878,953 B2 | 4/2005 | Stimpson et al. | |
| 7,053,392 B2 | 5/2006 | Stimpson et al. | |
| 7,256,898 B2 * | 8/2007 | Bucher | B23Q 17/2466 |
| | | | 356/614 |
| 9,297,891 B2 | 3/2016 | Karl | |
| 9,652,956 B2 | 5/2017 | Falkenberg et al. | |
| 9,815,166 B2 | 11/2017 | Goldstein et al. | |
| 10,024,964 B2 | 7/2018 | Pierce et al. | |
| 10,292,127 B2 | 5/2019 | Disatnik | |
| 10,775,765 B2 | 9/2020 | Moersch et al. | |
| 10,845,481 B2 | 11/2020 | Pierce et al. | |
| 11,209,258 B2 | 12/2021 | Styles et al. | |
| 11,389,882 B2 | 7/2022 | Picl et al. | |
| 11,415,412 B2 | 8/2022 | Buckingham et al. | |
| 12,030,152 B2 | 7/2024 | Stauber et al. | |
| 2001/0035535 A1 | 11/2001 | Hayashi | |
| 2002/0183670 A1 | 12/2002 | Driver, Jr. | |
| 2003/0060919 A1 | 3/2003 | Stimpson et al. | |
| 2003/0082995 A1 | 5/2003 | Cohen | |
| 2004/0069936 A1 | 4/2004 | Stimpson et al. | |
| 2005/0167619 A1 | 8/2005 | Stimpson et al. | |
| 2006/0192939 A1 | 8/2006 | Lebeau | |
| 2009/0051933 A1 | 2/2009 | Stimpson et al. | |
| 2012/0150354 A1 * | 6/2012 | Rogers | G05B 19/4015 |
| | | | 702/152 |
| 2012/0176864 A1 | 7/2012 | Karl | |
| 2015/0009321 A1 | 1/2015 | Goldstein et al. | |
| 2015/0124242 A1 | 5/2015 | Pierce et al. | |
| 2016/0093183 A1 | 3/2016 | Falkenberg et al. | |
| 2018/0299550 A1 | 10/2018 | Pierce et al. | |
| 2018/0356788 A1 | 12/2018 | Moersch et al. | |
| 2019/0376777 A1 | 12/2019 | Styles et al. | |
| 2020/0198081 A1 * | 6/2020 | Holloway | G01J 1/4257 |
| 2021/0197233 A1 * | 7/2021 | Ketterer | G01B 5/0002 |
| 2021/0323109 A1 | 10/2021 | Stauber et al. | |

FOREIGN PATENT DOCUMENTS

| | | | |
|---|---|---|---|
| CN | 105210125 A | 12/2015 | |
| CN | 105849620 A | 8/2016 | |
| CN | 109032068 A | 12/2018 | |
| CN | 109073731 A | 12/2018 | |
| CN | 110325931 A | 10/2019 | |
| CN | 111133272 A | 5/2020 | |
| DE | 102005043659 A1 | 3/2007 | |
| DE | 10 2013 011 307 A1 | 1/2015 | |
| DE | 102018006653 A1 | 2/2020 | |
| JP | H02-274455 A | 11/1990 | |
| JP | 2000-346614 A | 12/2000 | |
| JP | 2001-298001 A | 10/2001 | |
| JP | 2002-370140 A | 12/2002 | |
| JP | 2006-287111 A | 10/2006 | |
| JP | 2012-131007 A | 7/2012 | |
| JP | 2019-000977 A | 1/2019 | |
| WO | 01/38822 A1 | 5/2001 | |
| WO | 02/100592 A1 | 12/2002 | |
| WO | 2007/096585 A1 | 8/2007 | |
| WO | 2013/102900 A1 | 7/2013 | |
| WO | 2018/134585 A1 | 7/2018 | |
| WO | 2020/038894 A1 | 2/2020 | |

OTHER PUBLICATIONS

Dec. 22, 2021 Written Opinion of the International Searching Authority issued in Patent Application No. PCT/GB2021/052575.
Mar. 18, 2021 Search Report issued in Great Britain Patent Application No. GB2016009.9.

* cited by examiner

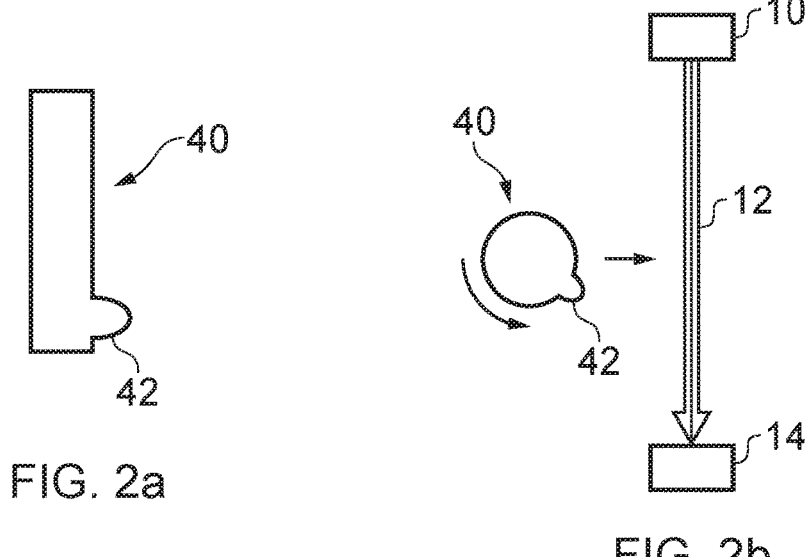
FIG. 2a
FIG. 2b
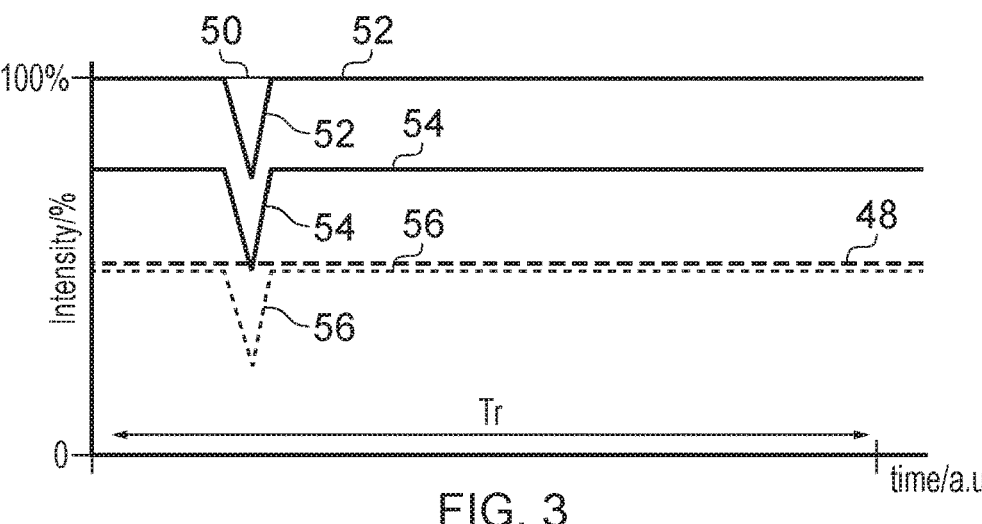
FIG. 3
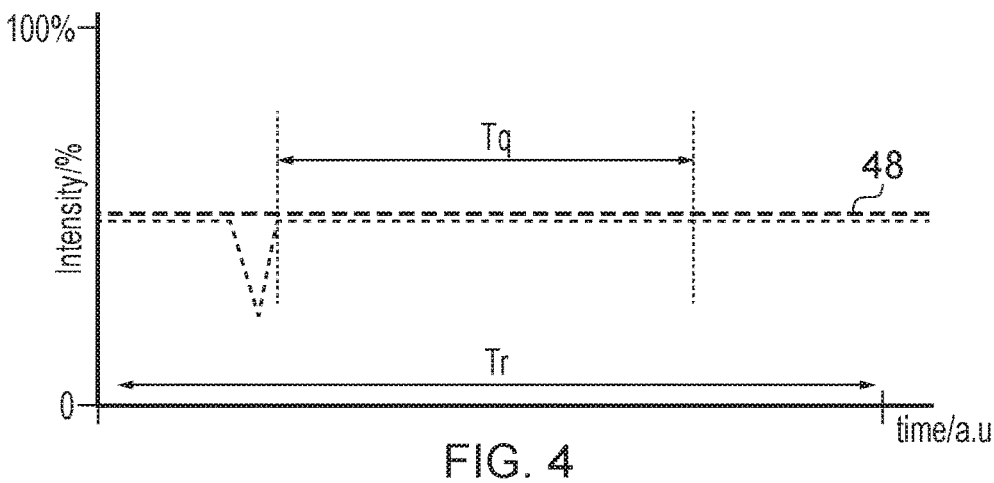
FIG. 4

METHOD FOR MEASURING NON-TOOTHED TOOLS USING A NON-CONTACT TOOL SETTER

The present invention relates to tool measurement. In particular, it relates to an improved method of using a non-contact tool setting system for measuring non-toothed tools, such as grinding tools, burr tools, calibration pins and the like.

Tool measurement apparatus for use on machine tools (e.g. machining centres, lathes, milling machines etc) is known. For example, the so-called NC4 non-contact tool setting system is sold by Renishaw plc, Wotton-Under-Edge, UK. The NC4 apparatus comprises a transmitter that includes a laser source for generating a light beam. The light beam is directed to a receiver through a region of free space into which a rotating tool can be placed. During a tool measurement operation, the machine tool on which the tool setter is mounted is programmed to move the tool into and/or out of the light beam. The output signal from the receiver indicates the amount of obscuration of the light beam and the apparatus compares this received intensity signal to a threshold. A so-called trigger signal is generated by the apparatus to indicate the tool has reached a certain position relative to the beam. The trigger signal allows a position of the tool to be established by the machine tool thereby allowing the length or diameter of tools to be measured and/or allowing tools to be monitored for any breakage or wear. WO01/38822 and WO2007/096585 describe aspects of the NC4 system. A similar system for tool measurement is also described in DE102005043659

As will be explained in more detail below, the NC4 system is operable in a variety of different modes to measure a dimension of a rotating tool. For example, the so-called light-to-dark tool measurement mode involves moving a rotating tool into the light beam and issuing a trigger signal when the received light intensity first drops below a fifty-percent threshold. The dark-to-light tool measurement mode involves initially obscuring the light beam with the rotating tool before moving it out of the beam. In this mode, the trigger signal is issued when the light intensity exceeds the fifty-percent threshold for an amount of time longer than one rotation of the tool.

The NC4 system described above allows the cutting dimensions of various types of tool to be measured, but it is designed primarily for use in measuring toothed cutting tools that comprise a small number of radially distributed cutting teeth separated by flutes. The present inventors have found that such prior art tool measurement techniques are not optimal for certain measurement tasks. In particular, the present inventors have found that the defects commonly found in unused diamond burrs and the like may protrude significantly further from the tool shaft than the plurality of abrasive diamond particles that will define the relevant grinding dimension of the burr tool in use. This has been found by the present inventors to introduce an unexpected and significant error into the measurement of the effective dimension (e.g. diameter) of such tools using the prior art tool measurement techniques described above. The present invention aims to mitigate at least some of the disadvantages of prior art measurement techniques.

According to a first aspect, there is provided a method of measuring at least one dimension of a non-toothed tool using a tool measurement apparatus comprising a transmitter and a receiver, the transmitter generating a beam of light that is directed towards the receiver, the receiver producing a received intensity signal related to the intensity of received light, the method comprising the steps of;

(i) rotating the non-toothed tool about its longitudinal axis whilst also moving the non-toothed tool relative to the light beam, and (ii) determining at least one dimension of the non-toothed tool by analysing variations in the received intensity signal that occur during step (i), characterised in that the signal analysis performed in step (ii) comprises determining when the received intensity signal has crossed a threshold for at least a defined duration, the defined duration being less than the time taken for one complete rotation of the non-toothed tool.

The present invention thus relates to a method of using a tool measurement apparatus to measure at least one dimension (e.g. the tool diameter, tool length etc) of a non-toothed tool. In one particular embodiment, the method may be used to measure rotating (non-toothed) grinding tools on a machine tool prior to first using such tools to abrade or grind a workpiece. The tool measurement apparatus for implementing the method comprises a transmitter and a receiver. In use, a beam of light is passed from the transmitter to the receiver. The amount of light reaching the receiver is measured and a received intensity signal is generated having a value that varies in relation (e.g. in proportion) to the amount of received light. The tool may be moved into and out of a region between the transmitter and receiver to thereby obscure (fully or partially) the light beam. Such tool measurement apparatus is often also termed an optical "break-beam" tool measurement device or a non-contact tool setter.

The present method comprises a step (i) of rotating the non-toothed tool whilst it is moved relative to the light beam and a step (ii) of analysing the received intensity signal during the motion of step (i). As explained below, step (i) may comprise the non-toothed tool being moved into the light beam (a so-called light-to-dark measurement) and/or the non-toothed tool being moved out of the light beam (a so-called dark-to-light measurement). In addition to such motion of the tool relative to (i.e. into or out of) the light beam the tool is also rotated about its longitudinal axis (e.g. by the spindle of an associated machine tool in which it may be held) during the measurement. This tool rotation will also cause any protrusions from the non-toothed tool to periodically enter and exit the light beam during each rotation, depending on the position of the tool relative to the beam. Analysis of the received intensity signal is then used in step (ii) to establish a dimension (or dimensions) of the tool. In other words, the size (e.g. radius, length etc) of the tool or of a certain feature of the tool is established. This analysis of variations in the received intensity signal may be performed by a processor, which in one embodiment may be provided as a part of the tool measurement apparatus.

The present invention is characterised by the step of determining when the received intensity signal has crossed a threshold for at least a defined duration. The threshold may be set at a certain level relative to a (maximum) received light level, such as the received intensity signal when the light beam is totally unobstructed. For example, a threshold level of fifty-percent of the maximum light level may be used. The defined duration is set to be less than the time taken for one complete rotation of the tool (i.e. a rotation or revolution of the tool through 360°). Instead of using a single threshold-crossing event for tool measurement purposes, the present invention instead determines when a threshold has been crossed and has remained crossed for a certain (predefined) period of time. The period of time that the threshold needs to remain crossed (i.e. the defined duration) is set to be less than the time taken for one complete rotation of the tool. As explained below, different defined durations may be used for different types of measurement application. It is also important to note that the defined duration is set relative to the speed of tool rotation (i.e. the time taken for one complete tool rotation) and can thus be adjusted by changing the speed of tool rotation and/or by altering the absolute time period used for analysis of the received intensity signal. In a preferred embodiment, the processor issues a trigger signal (e.g. that can be passed to an associated machine tool) as soon as the received intensity signal crosses the threshold for the defined duration. The position of the tool on receipt of such a trigger signal can then be measured (e.g. by an associated machine tool) to provide the tool dimension measurement.

An advantage of the method of the present invention is that certain protrusions from the tool (e.g. contaminants on a calibration tool or unwanted clumps of material on a diamond coated burr tool) can be excluded from the tool measurement. For example, the known NC4 apparatus described above implements both dark-to-light and light-to-dark measurement modes. In the prior art light-to-dark mode, a rotating tool is moved towards the light beam and a trigger signal is issued when the received intensity signal first drops below the fifty-percent threshold. In the prior art dark-to-light mode, the tool starts from a position within the light beam and is moved out of the beam. In this mode, the received intensity signal increases as the tool is moved out of the beam and a trigger signal is issued after the received intensity signal exceeds the fifty-percent threshold for more than an entire tool rotation (i.e. indicating the entire tool is sufficiently clear of the light beam). The prior art NC4 measurement modes thus both measure the maximum radius (or outermost flight circle) of the tool, even if that arises from a protrusion on the tool (e.g. a contaminant or a non-abrasive defect) rather than the dimension of the tool (e.g. the effective tool radius) that it is intended to measure.

In contrast to the above-described prior art methods implemented by the NC4 apparatus, the present invention allows such defects or contaminants to be excluded from the tool measurement by determining when the threshold is first crossed for a defined duration. In other words, the method does not simply use one threshold crossing event for tool measurement but instead assesses when the threshold has been crossed for a certain period of time (i.e. the defined duration) during one tool revolution. The threshold may be continuously crossed for the defined duration. Alternatively, the threshold may be non-continuously crossed for the defined duration (i.e. there may be a plurality of time periods when the threshold is crossed during one tool rotation that together equal or exceed the defined duration). Setting such a defined duration, which is less than the time taken for one complete rotation of the tool, allows any threshold crossings that arise from convex defects that it is wished to exclude from the tool measurement (e.g. contaminants, non-abrasive defects, oversize grit particles etc) to be ignored. A more robust, reliable and adaptable tool measurement method is thus provided that is highly suited to measuring grinding tools.

The detection of concave defects is also possible using the same method. In particular, setting the defined duration to be only a small percentage (e.g. less than 20% or less than 10%) of the time taken for one rotation of the tool can be used to measure such concave defects. An example of a concave defect may include a surface cavity in the non-toothed tool. Bald spots or defective patches on a grinding tool (e.g. a lack of diamonds on a particular portion of a diamond coated tool) may give rise to such a concave defect. Whilst such concave surface defects (cavities or dents) within the tool may not affect the overall tool geometry measurement, they may still cause poor surface quality on the workpiece and/or reduce tool lifetime.

The present method may be used to measure one or more dimensions (e.g. tool radius, tool length etc) of any non-toothed tool. The non-toothed tool may comprise a calibration tool (which is sometimes also called a calibration pin and is used for calibration, not workpiece processing, purposes) or a grinding tool for workpiece processing (i.e. a tool that removes material from a workpiece by an abrasive or grinding process). In the present context, a toothed tool means a cutting tool that includes one or multiple discrete cutting teeth that may be separated by flutes (i.e. recesses or channels for removal of cutting debris, coolant and the like). A non-toothed tool is thus a tool that does not include such cutting teeth. The non-toothed tool may have a nominally circular profile (albeit with multiple small protrusions or particles for abrading a surface). The non-toothed tool may be nominally rotationally symmetrical.

In a preferred embodiment, the non-toothed tool comprises a (non-toothed) grinding tool. The term "grinding tool" as used herein should be understood to include any type of abrasive tool that is used to abrade, remove or file away material from a workpiece by a grinding (i.e. abrasive rather than cutting) process. In other words, the term grinding encompasses techniques such as polishing, lapping, burnishing, honing, super-finishing, linishing etc. The grinding tool may be a burr (also spelt "bur") tool, a grinding wheel, a core drill, etc. The grinding tool may have a nominally circular cross-sectional profile. The grinding tool may be nominally rotationally symmetrical. The grinding tool may have a nominally continuous outer surface, or it may include one or more longitudinal slots to help evacuate coolant or cutting debris.

The grinding tool may be of any type that abrades material from an object that is being processed. The grinding tool may comprise a shaft having a roughened surface or it may comprise a rough surface coating that is applied to a central shaft. The grinding tool may include multiple abrasive particles or pieces of grit embedded within, or coated onto, a substrate (e.g. in the form of a rod or shaft). Such a substrate may be vitreous, glass, resin, metal or any suitable combination of materials. The grit may comprise abrasive or super-abrasive particles. The grit may comprise particles of diamond, cubic boron nitride (CBN), Aluminium oxide, iron oxide etc. Any such grit particles may be held in a particle matrix by a (e.g. softer or less abrasive) retaining material. As explained below, the method is particularly suited for use in measuring grinding tools formed by an electroplating process (i.e. electroplated grinding tools) because blisters are often generated during such a tool manufacturing process. In the example outlined below, the method is implemented to measure grinding tools in the form of grit-based grinding burrs, particularly diamond coated burrs (DCBs).

The non-toothed tool may alternatively comprise a calibration tool or pin. Such a calibration tool may be a precision manufactured rod having a nominally circular cross-section and smooth outer surface that is used for calibration purposes. The calibration tool may also comprise a datum sphere or hemisphere. The calibration tool may also comprise a measurement probe having a stylus. Such a stylus may include a shaft having a tip in the form of a ruby or diamond sphere.

The skilled person would select a defined duration for use in the method that is suitable for the particular tool measurement that is being undertaken. As mentioned above, a preferred use of the method of the present invention is to measure grinding tools, such as burr tools having multiple (e.g. grit-like) abrasive elements. In such an embodiment, the defined duration used by the processor may be selected to allow a dimension (e.g. effective radius) of the burr tool to be measured that is not affected by any (non-abrasive) clumps of material (e.g. arising from manufacturing defects) that are present on the tool. In other words, the defined duration is selected to allow the effect of any protruding clumps formed on the surface of the diamond coated burr tool to be substantially excluded from the at least one dimension that is determined in step (ii). As explained below, the defined duration used in the method of the present invention may also be selected for contamination or dirt rejection purposes (e.g. to exclude the effects of dirt that may become attached to the tool on the tool dimension measurement).

The defined duration may be adjustable (e.g. user or manufacturer adjustable). For example, the apparatus may be programmed (e.g. by a user/manufacturer) with a defined duration that is to be used in the analysis. In particular, the apparatus may include a processor for the analysis and appropriate commands to set the defined duration may be sent to the processor. As mentioned above, the defined duration is dependent on the tool rotation speed that is used during the tool measurement. The defined duration may thus be set by adjusting the clock or timing signals (e.g. within the processor) that are used to analyse the received intensity signal and/or by changing the speed of tool rotation. The step of adjusting the defined duration may thus comprise a step of adjusting the tool rotation speed. The tool may rotate at a high-speed during measurement. For example, the tool may rotate at more than 200 revolutions per minute (rpm), more than 1000 rpm, more than 5000 rpm, more than 10,000 rpm, more than 20,000 rpm, more than 40,000 rpm, more than 60,000 rpm or more than 100,000 rpm. The defined duration may, for example, be expressed as a time value (e.g. in microseconds or milliseconds) or as a proportion (e.g. percentage) of the time taken for one rotation of the tool. A call-up command line that is used to run the method of the present invention may include a variable that defines the defined duration as a proportion (e.g. percentage) of the time taken for one tool rotation. The defined duration is conveniently set based on the particular tool or tool type that is to be measured. The method may be repeated on the same tool a plurality of times using different defined durations (e.g. to exclude or include surface features of different sizes).

Advantageously, the defined duration is greater than 1% of the time taken for one rotation of the tool. More preferably, the defined duration is greater than 2%, or greater than 5%, or greater than 10%, or greater than 20%, or greater than 25% of the time taken for one rotation of the tool. Advantageously, the defined duration is less than 99% of the time taken for one rotation of the tool. More preferably, the defined duration is less than 95%, or less than 90%, or less than 80%, or less than 75%, or less than 50% of the time taken for one rotation of the tool. The defined duration may be less than 25%, less than 10% or less than 5% of the time taken for one rotation of the tool; for example, to allow concave defects or the like to be measured.

The analysis of step (ii) may establish whether the threshold is continuously crossed or non-continuously crossed for the defined duration for each tool rotation period. For example, step (ii) may comprise determining whether the received intensity signal has continuously crossed the threshold for at least the defined duration. Alternatively, step (ii) may comprise establishing the total (resultant) duration per revolution that the threshold is crossed (i.e. even if this comprises a plurality of discrete periods during which the threshold is crossed). This may be done by identifying each time the received intensity signal crosses (e.g. exceeds or drops below, as appropriate) the threshold and determining when the total duration exceeds the defined duration. Any other suitable analysis technique may be implemented. The time of the threshold crossings during each rotation may also be recorded and used to identify or map the location of any defects on the non-toothed tool.

As mentioned above, the method may comprise a so-called light-to-dark tool measurement. In other words, step (i) may comprise moving the rotating non-toothed tool into the light beam from a location away from the light beam. Analysis of the variations in the received intensity signal may thus occur when a rotating tool is moved into the light beam from a location away from (i.e. outside) the light beam. In such an arrangement, the light beam is initially unobstructed and the received intensity signal will thus take a maximum (e.g. one hundred percent) value. As the rotating tool starts to enter the beam, any protrusions from the tool will begin to periodically enter the light beam as the tool rotates. As the tool movement into the light beam continues, the received intensity signal will drop and may even transiently drop below the threshold (which may be set at fifty percent of the maximum intensity).

In the light-to-dark mode measurements of the prior art mentioned above, the received intensity signal is monitored to determine when it drops below the threshold for the first time. Instead, the method of the present invention determines when the received intensity signal has dropped below the threshold and remained below that threshold for at least the defined duration. The received intensity signal may continuously remain below the threshold for the defined duration. Alternatively, the received intensity signal may drop below and rise above the threshold a plurality of times during one tool rotation, with the total time that the received intensity signal remains below the threshold being at least equal to the defined duration. The position of the tool is measured when this criterion has been met thus providing a measurement of the required tool dimension.

The method of the present invention, when implementing a light-to-dark tool measurement, thus effectively ignores any transient dips in the received intensity signal that have a duration shorter than the defined duration. Instead, it is established when the light beam is obscured sufficiently for the received intensity signal to drop below the threshold for a time that is equal to or exceeds the defined duration. In one embodiment, a trigger signal is issued by the processor of a tool measurement apparatus when the received intensity signal drops below the threshold for the defined duration. The trigger signal can be used by an associated machine tool carrying the tool to provide a measurement of tool position from which a tool dimension can be established.

It should be noted that, when taking light-to-dark tool measurements, it is possible to additionally implement a so-called drip rejection filter. In prior art arrangements, this filter issues a trigger signal only if a threshold crossing event is followed by a second such event that is temporally separated from the first event by an interval of time equal to one complete rotation of the tool. This ensures that any drips of coolant etc that might transiently pass through the light beam and which do not typically occur at regular intervals are not falsely interpreted as the presence of a tool in the light beam. A similar drip rejection filter could be used with the present invention. In other words, a trigger signal could be issued only if a first event in which the received intensity signal drops below the threshold for the defined duration is followed by a second similar event after a time interval equal to one complete rotation of the tool.

The method may comprise a so-called dark-to-light tool measurement. In other words, step (i) may comprise moving the rotating non-toothed tool out of the light beam. This measurement may be performed instead of, or as well as, the light-to-dark measurement. For such a measurement, the variations in the received intensity signal are analysed when a rotating tool located in the light beam is moved out of the light beam. In such an arrangement, the light beam is initially obstructed (e.g. fully obstructed to block all light from the transmitter reaching the receiver) and the received intensity signal will thus initially take a minimum or zero value. As the rotating tool starts to exit the beam, any protrusions from the tool (e.g. blisters, dirt etc) will periodically leave and then re-enter the light beam as the tool rotates. As the tool movement out of the light beam continues, the received intensity signal will rise overall (noting there may be a slight flicker on the signal from a grinding tool due to the multiple abrasive particles on the tool surface) but there will be periodic drops or dips in the signal due to the protrusions re-entering the beam. There may thus be times during each tool rotation when the received light intensity exceeds the threshold (which again may be set at fifty percent of the maximum intensity) and other times when it drops back below the threshold. In the dark-to-light mode measurements of the prior art mentioned above, the received intensity signal is monitored and it is determined when the received light intensity exceeds the threshold for at least an entire rotation of the tool (i.e. the beam is clear for at least one tool rotation). Instead, the processor of the present invention determines when the received intensity signal has exceeded the threshold for the defined duration (which is less than the time taken for one complete rotation of the tool). The received intensity signal may continuously exceed the threshold for the defined duration. Alternatively, the received intensity signal may exceed and drop below the threshold a plurality of times during one tool rotation, with the total time that the signal exceeds the threshold being at least equal to the defined duration. The position of the tool is measured when this criterion has been met thus providing a measurement of the required tool dimension.

The present invention, when used for a dark-to-light tool measurement, thus ascertains when the received intensity signal exceeds the threshold for the defined duration (i.e. which is less than the time taken for one complete rotation of the tool). In one embodiment, a trigger signal is issued by the tool measurement apparatus when the received intensity signal exceeds the threshold for the defined duration. Such a trigger signal can be used by an associated machine tool carrying the tool to provide a measurement of tool position from which a tool dimension can be established. The method of the present invention therefore does not wait for the threshold to be exceeded for an entire rotation of the tool as per the prior art, but instead ascertains when the threshold has been exceeded for a certain proportion or part of one rotation. This allows the effect of protrusions on the tool, e.g. contaminants or clumps of material in the case of a burr tool, to be excluded or ignored.

The method may be implemented using a tool measurement apparatus mounted to a machine tool. The machine tool may have a spindle that holds the non-toothed tool. The machine tool may be configured to provide the rotation and motion of the non-toothed tool of step (i). Step (ii) may comprise the tool measurement apparatus issuing a trigger signal to the machine tool when the received intensity signal has crossed the threshold for the defined duration. The machine tool may provide a measure of the position of the non-toothed tool on receipt of the trigger signal from which the at least one dimension of the non-toothed tool is derived.

The various constituent parts forming the apparatus used in the method of the present invention may be distributed as required. For example, a single housing unit (e.g. mountable within a machine tool enclosure) may contain each of the transmitter, the receiver and a processor. A trigger signal may be generated by the processor and passed from the housing unit to an associated machine tool controller. The trigger signal may be communicated over a wired or wireless link. A wired link may provide power to the components of the housing unit or the housing unit may include a battery power source.

Alternatively, the apparatus used in the method may be formed as a plurality of units. For example, a measurement unit may be provided that includes at least the receiver. The measurement unit may also comprise the transmitter. The measurement unit may be mounted within a machine tool enclosure (e.g. it may include protection against the ingress of coolant and other machining contaminants). A separate processing unit (e.g. an interface) may include the processor or the processor may be distributed over several processing unit. The processing unit may form part of the associated machine tool. In the above described arrangement, the received intensity signal may be passed from the measurement unit to the processing unit. This passage may be over a communications link. The communications link may be wired or wireless. A dedicated or shared communications link could be used for this purpose. The received intensity signal may be passed as an analogue signal (e.g. the signal may be a voltage that varies in proportion to received light intensity). Preferably, the receiver of the apparatus includes an analogue-to-digital converter (ADC). The received intensity signal may then be passed to the processor as a digital signal. The receiver may include signal processing electronics, or it could just output a raw intensity signal or signals.

The transmitter of the apparatus used in the method may comprise a laser, for example a laser diode. The transmitted light beam may have any wavelength (e.g. a red, green, blue etc laser beam may be generated). The light beam may be collimated. The light beam may be a focused beam. The receiver could comprise a single detector element (e.g. a photodiode) for detecting received light intensity. Alternatively, the receiver could include a plurality of detector elements. In such an example, the received light intensity signal may be generated by combining the light intensity measured by a plurality of detector elements. The receiver may include (analogue and/or digital) electronics for pre-processing of the light intensity signal. Additional processing of the received intensity signal may also be performed by a processor before its comparison to the threshold.

The apparatus on which the method is implemented may include a processor that is arranged to issue a trigger signal when the received intensity signal has crossed the threshold for the defined duration. In other words, the issuance of a trigger signal may be used to indicate that the criterion being monitored by the processor (i.e. that the received intensity signal has crossed the threshold for the defined duration) has been met. Issuance of the trigger signal may comprise latching a signal line (e.g. raising its level from low to high). Alternatively, the trigger signal may be issued as a pulse or a repeating series of pulses. The trigger signal may be output as an analogue signal or it may be communicated via a digital interface (e.g. as a time-stamped event). An associated machine tool controller may receive and act upon a received trigger signal. In particular, the receipt of the trigger signal may cause the position of the tool within the machine tool to be recorded (i.e. to allow the position of tool when the trigger signal was issued to be established). In this manner, the required measurement of a tool dimension is provided. The receipt of a trigger signal may also stop the movement of the tool relative to (i.e. into or out of) the light beam. If the processor is provided as part of the machine tool controller, there may be no need for such a trigger signal to be generated.

The method may, when the non-toothed tool is a grinding tool, comprise an additional step of grinding a workpiece. In other words, the grinding tool may be used to process (remove material from) a workpiece. As mentioned above, such a grinding tool may be any type of grinding tool (e.g. a diamond coated burr tool). The workpiece that is processed may, for example, be a glass ceramic component (e.g. for use in a consumer electronics device).

Also described herein is a method for measuring a dimension of a tool, such as a grinding tool. The method may comprise a step of directing a beam of light towards a receiver. The receiver may produce a received intensity signal related to the intensity of received light. The method may comprise moving a rotating tool relative to the light beam. Variations in the received intensity signal may be analysed to measure the tool. The method may include a step of determining, during the movement step, when the received intensity signal crosses a threshold for at least a defined duration. The defined duration may be less than the time taken for one complete rotation of the tool. Any tool may be measured using the method. Advantageously, the tool is a grinding tool. The tool may be a burr tool. The method may include any other step or steps described elsewhere herein.

Also described herein is a tool measurement apparatus that may be used for measuring a dimension of a tool. The tool measurement apparatus may be configured to implement, or may include any of the features described in the context of, the method described herein. The apparatus may comprise a transmitter. The transmitter may produce a beam of light. The beam of light may be directed towards a receiver. The receiver may produce a received intensity signal. The received intensity signal may be related (e.g. be proportional) to the intensity of received light. A processor may be provided for analysing variations in the received intensity signal. The processor may perform the analysis when a rotating tool is moved through the light beam. The processor may perform the analysis when a rotating tool is moved into the light beam. The processor may perform the analysis when a rotating tool is moved out of the light beam. The analysis may enable a dimension of the tool to be measured. The processor may be configured to determine when the received intensity signal has crossed a threshold for at least a defined duration. The defined duration may be less than the time taken for one complete rotation of the tool. The processor may be configured to determine when the received intensity signal exceeds a threshold for a duration less than the time taken for one complete rotation of the tool. The processor may be configured to determine when the received intensity signal drops below and remains below a threshold for a predetermined duration.

Figure 5:
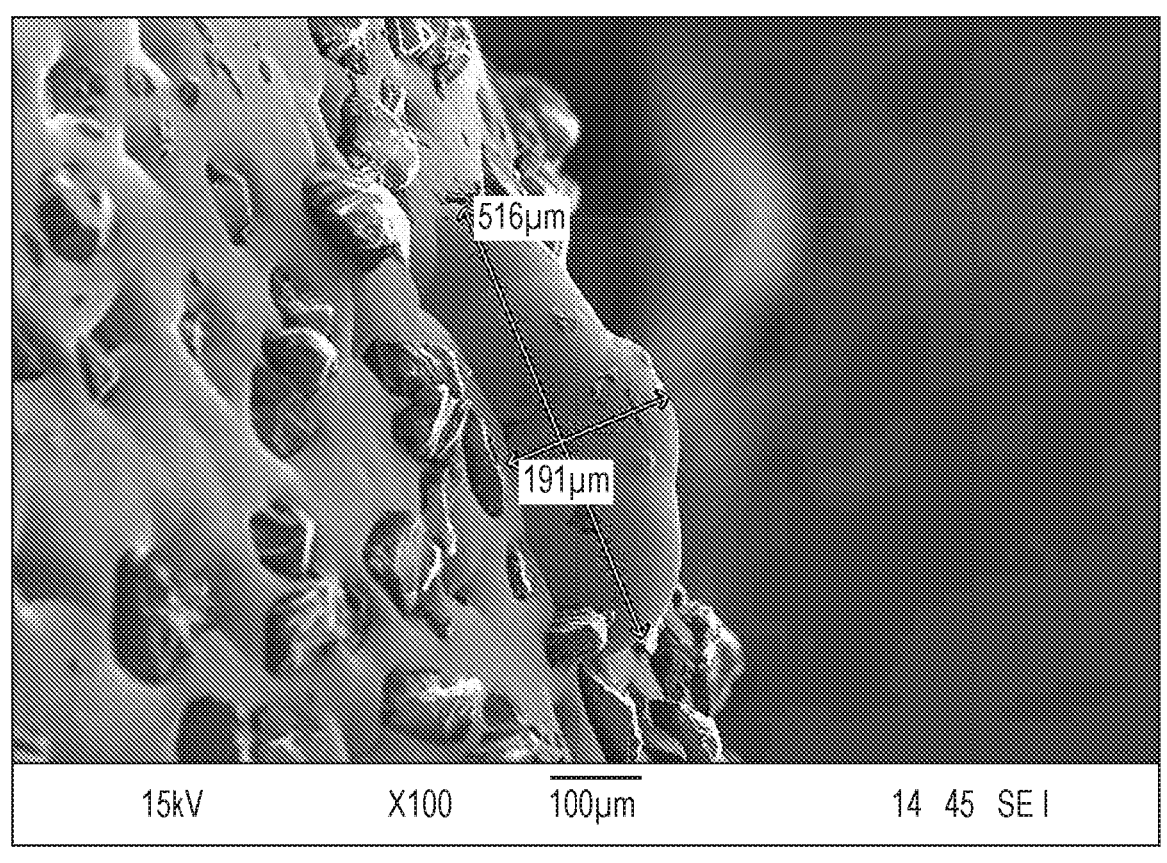
Figure 6:
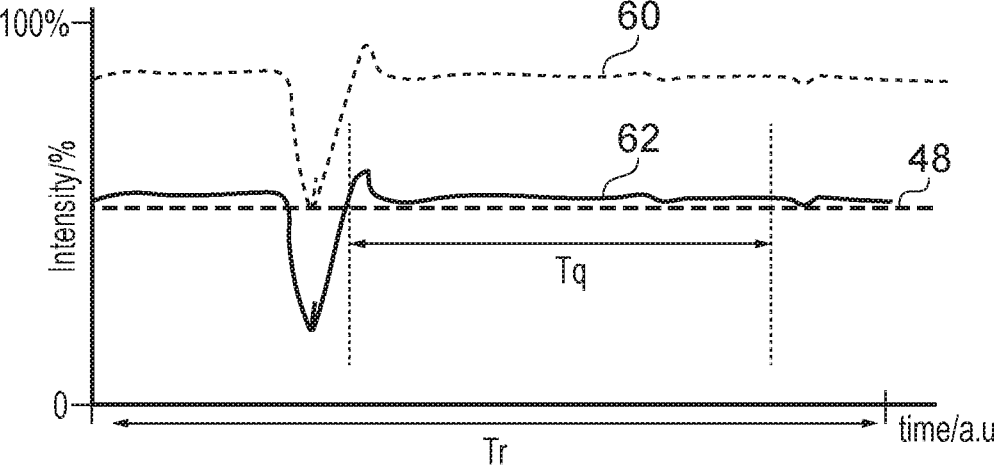
Figure 7:
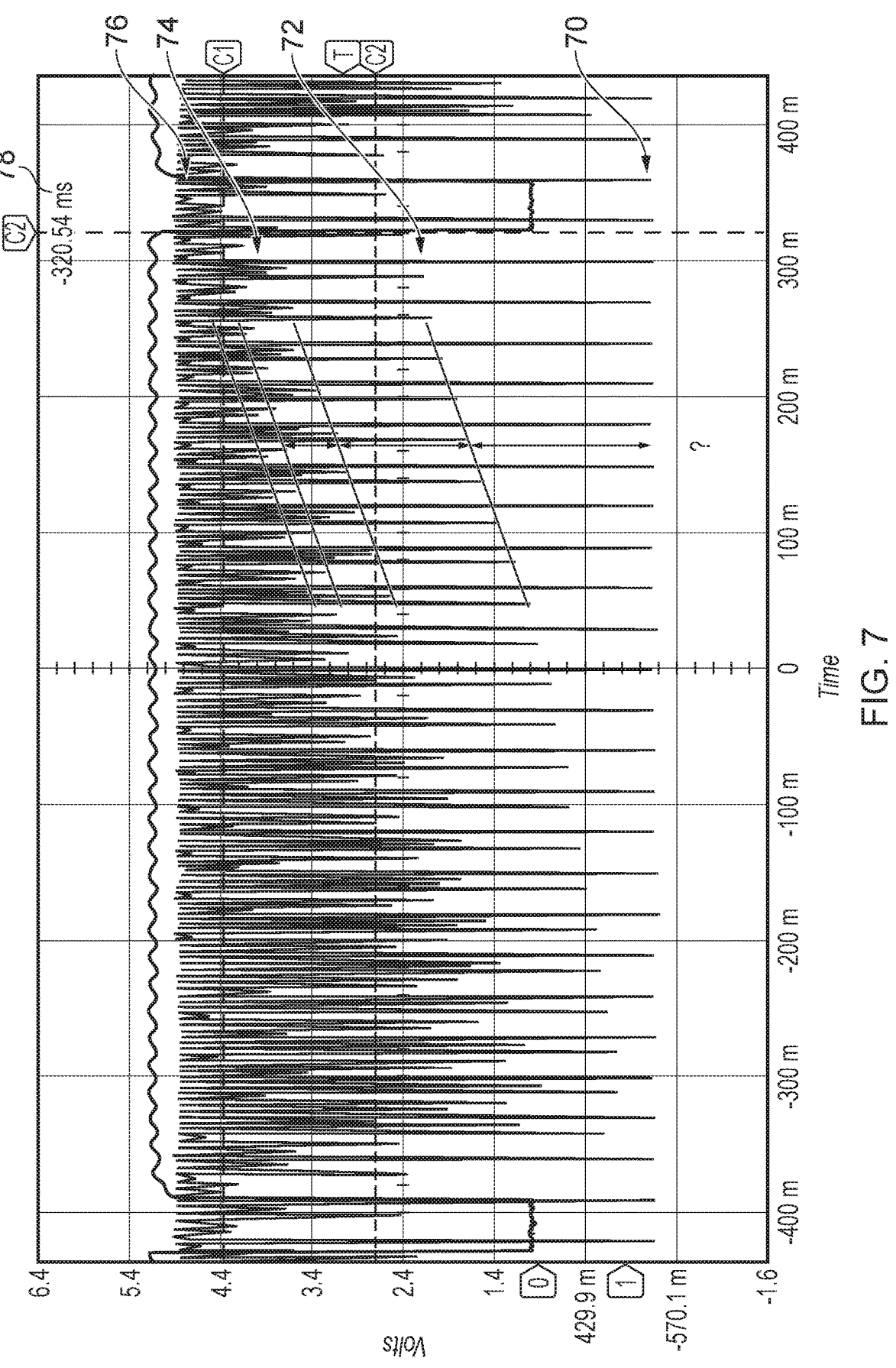

The present invention will now be described, by way of example only, with reference to the accompanying drawings in which;

FIG. 1 shows a non-contact tool setting device,

FIGS. 2a and 2b illustrate a calibration tool with a contaminant attached thereto, FIG. 3 shows the effect of the contaminant of FIGS. 2a and 2b on the light intensity profile during a light-to-dark measurement, FIG. 4 illustrates how the technique of the present invention can exclude the effect of the contaminant, FIG. 5 is a scanning electron microscope (SEM) image of unwanted clumps of material as formed during the manufacture of a grinding tool, FIG. 6 schematically illustrates the effect of the clump on the received light intensity during a dark-to-light measurement, and FIG. 7 is collected data that shows the effect of multiple abrasive elements when measuring a grinding tool.

Referring to FIG. 1, a schematic illustration of a tool measurement apparatus is provided. The apparatus comprises a transmitter 10 for generating a beam of light 12. The transmitter 10 generates the light beam 12 using a laser diode and suitable optics (not shown). A receiver 14 is also illustrated for receiving the beam of light 12. The receiver comprises a photodiode (not shown) for detecting the beam of light 12.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The apparatus also comprises an interface 15 connected to the transmitter 10 and receiver 14 via electrical cables 17. The interface 15 provides electrical power to the transmitter 10 and receiver 14 and also receives a beam intensity signal (also termed a received intensity signal) from the photodiode detector of the receiver 14. The interface 15 also comprises a processor 24 that analyses the beam intensity signal and generates a trigger signal. This trigger signal is passed to the SKIP input of a controller 30 of an associated machine tool via a cable 28. The position of the tool, as measured by the machine tool, is captured on receipt of the trigger signal from the interface 15 thereby allowing a tool size (e.g. tool length or diameter) measurement to be made. The trigger signal may be output in a plurality of different ways, depending on the configuration of the controller 30. For example, the trigger signal may be communicated by latching the voltage of a line connected to the SKIP input or by generating a pulse or series of pulses that are passed to the SKIP input. The trigger signal may alternatively be passed to the controller 30 over a digital data bus (e.g. as described in WO2018/134585).

FIGS. 2a and 2b show a calibration tool 40 (i.e. an example of a non-toothed tool), which may also be termed a calibration pin, in side-on and cross-sectional views respectively. The calibration tool 40 is an elongate cylinder having a known (e.g. calibrated) radius. Also shown is the presence of a contaminant 42 (the relative size of which is exaggerated for illustration purposes) on the calibration tool 40. The contaminant 42 may, for example, be dirt or debris that attaches itself to the calibration tool 40 and can't be easily removed by high speed rotation or using an air blast or similar tool cleaning technique. FIG. 2b illustrates the calibration tool 40 being rotated at a high speed about its elongate axis whilst also being translated into the light beam 12 that passes between the transmitter 10 and receiver 14 of the above described tool measurement apparatus.

FIG. 3 plots the received intensity signal for one complete tool rotation when the calibration tool 40 shown in FIGS. 2a and 2b is at four different locations relative to the light beam 12. The graph shows the received intensity signal (in percent) plotted against time, where the time taken for a single rotation of the calibration tool 40 is Tr. Also shown is the fifty percent level 48 that is used as a threshold level. It should be noted that the use of fifty percent is arbitrary and the threshold could be set at a different value.

Before the tool 40 enters the light beam 12, the beam is unbroken and hence 100% of the light beam passes to the receiver; this is shown as the plotted line 50. The line 52 shows the received intensity when the tool 40 is moved so that the contaminant 42 just enters the extreme edge of the light beam 12 once per rotation, but before the tool 40 is advanced sufficiency to allow any of the cylindrical core of the tool 40 to enter the beam. The small dip visible in the light intensity plot 52 thus corresponds to the contaminant partially obscuring the beam, once per rotation.

In the prior art NC4 apparatus mentioned above, the received intensity signal is compared to the fifty-percent trigger threshold as the rotating tool is advanced into the light beam 12. The apparatus issues a trigger signal when the received intensity signal drops below the threshold 48; this is the scenario illustrated by the plotted line 54 in FIG. 3. In the prior art tool measurement apparatus, the issued trigger signal would thus cause the associated machine tool to measure the position of the tool 40 when 50% of the beam is blocked at some point during the tool rotation. In this example, the occlusion of the beam by the contaminant would mean the measured position (and hence the measured tool radius) would not be an accurate measure of the diameter of the cylindrical tool body. Instead, the apparatus would measure the radius of the outer flight circle of the contaminant. The measured radius of the calibration tool would thus be greater, by an amount equal to the distance by which the contaminant 42 protrudes from the cylindrical tool body, than the actual radius of the tool.

At this point it should be noted that, for many types of tool, the maximum radius (as defined by the outer "flight circle" of the tool) does provide a suitable measure of the effective cutting radius. In particular, a toothed cutting tool (e.g. for milling, drilling etc) may have multiple teeth but the depth of cut it makes in a workpiece will be determined by the outer flight circle of those teeth. The present inventors have, however, realised that this is not always the case for non-toothed tools. In the example shown in FIGS. 2 and 3, a more reliable measurement of calibration tool radius could be attained by ignoring any small dips in the received intensity signal that arise from contaminants and instead ascertaining the tool position when the bulk of the received intensity signal drops below the threshold 48. This is illustrated as plot 56 in FIG. 3.

Referring next to FIG. 4, it will be described how the apparatus may better measure the radius of the (non-toothed) calibration tool 40 illustrated in FIGS. 2a and 2b.

The received intensity signal is again continually compared to the threshold 48 as the tool is moved into the beam. However, a trigger signal is only issued when the received intensity signal drops below the threshold and then remains below that trigger threshold for the duration of time Tq. This should be contrasted to prior art light-to-dark measurements where trigger signal generation is based on the first threshold-crossing (irrespective of whether the received intensity signal then increases in intensity and crosses back over the threshold). The present method thus effectively creates the need for the received intensity signal to drop and remain below the threshold 48 within the window of time Tq before a trigger signal is issued. In FIG. 4, the duration Tq is set to equal half of the time take for one rotation of the tool (i.e. Tq=Tr/2). This means that transient dips in the received intensity signal are effectively ignored (i.e. they do not result in the generation of a trigger signal) and the trigger signal is only issued when the received intensity signal drops below the threshold 48 for the duration Tq.

Referring next to FIGS. 5 to 7, a further application of the present invention for measuring burr tools (i.e. further examples of non-toothed tools) will be described.

Grinding tools (such as grinding burrs) are often used to alter the profile of glass ceramic components. The use of such burrs has increased over recent years for the manufacture of smart phones, tablets and the like. A number of different manufacturing processes are used to manufacture diamond coated burrs, such as sintering and/or electroplating. In a sintered tool, the diamonds are bonded to the matrix at very high temperatures and therefore the tool has several layers of diamonds. Dressing or cleaning such a tool with an aluminium oxide stone will help improve the grinding quality and hence maintain the life of the burr, or wheel, by revealing a new layer of diamonds each time. Electroplated tools comprise coated diamonds that are bonded to the tool using nickel, stainless steel etc in a single layer. Although electroplated tools have a shorter life than sintered tools, they are a lower cost alternative. It is, of course, also possible to use tools that include abrasive particles other than diamond (e.g. CBN, Aluminium oxide etc).

An issue that can be encountered is that burr tools can suffer from a quality problem. In particular, "clumps" (often called blisters or nodules) of bonding (i.e. non-abrasive) material can be present on the surface. It also possible for oversized particles or contaminants (dirt) to form protrusions that have a similar effect. FIG. illustrates an SEM image of such a clump (i.e. the protrusion having the dimension of 191 μm by 516 μm) on a burr tool. These clumps are defects from the manufacturing (e.g. electroplating) process. If the tool is optically measured prior to it being used, the measured tool geometry may be affected by such clumps even though such clumps are highly likely to be knocked off when the tool is first used to modify the surface of a component. Attempts to clean such tools prior to measurement using an air blast have been found to be insufficient to remove such defects.

FIG. 6 illustrates schematically the effect of a contaminant (such a clump of material) on a burr tool when performing a dark-to-light measurement using the tool measurement apparatus of FIG. 1. FIG. 6 shows two overlaid plots of the received light intensity as a function of time for two positions of the tool relative to the light beam. In such a dark-to-light measurement, the tool is initially located in a position that completely obscures the light beam. The tool, which is rotating about its elongate axis, is then moved (translated) out of the beam whilst the received intensity signal is monitored.

In prior art dark-to-light measurements, the apparatus determines when the tool is clear of the light beam (i.e. when the received intensity signal continuously exceeds the fifty-percent threshold). In particular, prior art apparatus issues a trigger signal after the received intensity signal exceeds the fifty-percent threshold and remains above that threshold for more than one complete rotation of the tool. This condition only occurs when the clump of material on the tool no longer obscures more than half of the light beam when it passes through it. The dashed line 60 of FIG. 6 shows the last rotation of the tool in which the fifty-percent threshold 48 is crossed. A trigger signal is issued after one further rotation of the tool, which is the first point in time when it can be confirmed that the signal has not dropped back below the fifty-percent threshold 48. For completeness, it should be noted that the effect of such a constant delay (i.e. a delay equal to the duration of one tool rotation) can be taken into account by appropriate calibration without affecting the accuracy of the position measurement.

The above-described prior art dark-to-light measurements thus measures the outermost flight circle of the tool. For the burr tool, this means the measured radius using the prior art dark-to-light method is equal to the radius of the tool in the vicinity of the clump of material. As explained above, the clump of material is likely to break off during a grinding process which means the measured radius is larger (potentially by many hundreds of microns) than the effective radius of the tool. For high tolerance manufacturing processes, this level of error can be problematic and may result in parts having to be scrapped.

In the method of the present invention, the apparatus issues a trigger signal after the received intensity signal exceeds the fifty-percent threshold and remains above that threshold for a defined period of time Tq. The time period Tq is less than the time taken for one complete rotation of the tool (i.e. Tr) and in the present example is equal to half the time taken for one tool rotation. The solid line 62 of FIG. 6 shows the first rotation in which this criterion has been met and a trigger signal is issued after the time period Tq. It should be noted that the intensity profile of the solid line 62 is generated before that shown by the dashed line 60 (i.e. the tool is withdrawn from the beam by a smaller distance using the method of the present invention before the trigger signal is issued). The position of the tool on receipt of the trigger signal provides a measure of the radius of the tool but excludes the effect of the clump of material. A more realistic tool radius measurement is thus provided.

The above-described example illustrates determining when the received intensity signal continually exceeds the fifty-percent threshold for the defined duration (Tq). However, it should be noted that it is not necessary for the threshold to be continuously exceeded for the defined duration (Tq). If the received intensity signal crosses back and forth over the threshold a plurality of times per tool rotation, it would instead be possible to measure the total amount of time that the threshold was exceeded per tool rotation and determine if this at least equals the defined duration. In other words, the duration of multiple time periods (e.g. $T_1$, $T_2$, $T_3$ etc) when the threshold was exceeded during a single tool rotation could be added together to ascertain if the threshold had been crossed for at least the defined duration.

The above example relates to a protrusion on the burr tool. However, it is also possible for such a burr tool to include a cavity (i.e. a dent or valley) in the otherwise round surface. In such an example, there would be a spike rather than a dip in the received intensity signals shown in FIG. 6. Geometrical information on such a cavity could be measured by setting the defined duration (Tq) to be sufficiently short (e.g. 5% to 10% of the rotation duration) to trigger when the spike in the received intensity signal crosses the threshold. This would allow the apparatus to take measurements of a dimension of the cavity.

It should be noted that the various intensity plots described above have been simplified to aid explanation. A practical example of the implementation of the invention will next be described with reference to FIG. 7.

In FIG. 7, the received intensity signal is shown that was collected for a newly manufactured (i.e. unused) burr tool as part of a dark-to-light measurement. The plot shows the repeating pattern of light that is detected as the tool is rotated at high speed and also translated so as to move out of the light beam. In particular, twenty-nine rotations of the tool are shown whilst the tool is withdrawn from the light beam. The various dips in the signal are caused by the various abrasive particles of the burr tool entering and obscuring the beam on each tool rotation.

A first set of dips 70 in the signal are caused by the longest particle protruding from the tool which is a defect (or clump) of the type described above. A second set of dips 72 in the signal relate to the second longest particle, which protrudes slightly more than the third, fourth and fifth longest particles which produce the series of three dips labelled 74. Many further particles protrude by a similar amount to the third, fourth and fifth longest particles and these dips in the signal are labelled 76.

It can be seen from FIG. 7 that the intensity associated with most of the minima of the dips, except the first set of dips 70, follow a similar pattern of increasing in intensity over time. However, the longest (defect) particle still fully obscures the beam on each rotation for entire duration of the collected data set shown in FIG. 7.

If the prior art method of dark-to-light measurement was used, the tool would continue to move out of the beam until the longest (defect) particle obscured no more than half of the light beam during a tool rotation. This would have given an erroneous result because such a particle would simply break away from the tool on contact with an object to be cut. Instead, the present method effectively excludes the first set of dips 70 in the signal from the process of assessing when the fifty-percent "trigger" threshold has been exceeded. This is done by issuing the trigger signal as soon as the received intensity signal exceeds and remains above the fifty-percent threshold (2.4v in FIG. 7) for a duration of time less than the time taken for one rotation of the tool. In particular, a complete tool rotation occurs every 30 ms in the example of FIG. 7. The trigger signal is issued after the beam is first cleared (i.e. the 2.4v threshold is exceeded) and remains clear for a duration of at least 20 ms. A trigger signal is thus issued at the time stamp 320.54 ms (i.e. as indicated by the dashed line labelled as 78 in FIG. 7).

It should be noted that the duration that the beam needs to remain clear (i.e. so the signal exceeds the fifty-percent threshold) before a trigger signal is issued could be reduced to also exclude the effects of the second set of dips 72 in the signal that relate to the second longest particle. The radius of the third longest particle would then be measured. It can thus be seen that appropriate setting of the duration that the beam needs to remain clear can be used to exclude certain protrusions from the tool position measurement. In other word, the width of the window of time over which the intensity signal crosses the threshold can be increased and decreased as desired to selectively exclude the desired number of the longest protruding particles present on the tool from the tool measurement.

In the above example, a trigger signal is issued when the intensity signal exceeds the threshold for 20 ms during the 30 ms taken for one tool rotation. The defined duration is thus 20 ms or two-thirds (66%) of the time taken for one tool rotation. Other defined durations may be used for different measurement tasks, as summarised in the non-exhaustive list of examples below:

Effective grinding diameter excluding blisters: To measure the outer extremity of the burr whilst the tool is rotating a defined duration of at least 75% of the time taken for one tool rotation is preferred.

Length measurement excluding blisters: When measuring the end of a burr a defect will pass through the beam twice every rotation because the whole cross section is within the beam. The defined duration should thus be less than 50% (e.g. 40%) of the rotation duration.

Cavity (manufacturing defects in the roundness of the burr). This is to detect imperfections that arise during the burr manufacturing process that look like dents or valleys in the otherwise round surface of the burr. A valley defect in the burr can be detected with a very low rotation period percentage. A defined duration of 10% or less of the rotation duration would be most suitable (i.e. it would allow geometrical information about such valleys to be measured).

In the examples outlined above, the apparatus is arranged so that it can ignore unexpected contaminants or particles on a non-toothed tool. Such contaminants are of unknown size and location on each tool and will vary from tool to tool.

In all the embodiments described above, the apparatus includes an interface for analysing the received intensity signal. It is important to note that this is not essential, and the method of the present invention can be implemented on many different configurations of apparatus. For example, a tool measurement device (e.g. having the transmitter/receiver) may be provided as a unit that is mounted within the machine tool enclosure. The received intensity signal may be output from the tool measurement device (e.g. in digital or analogue form) to an interface, computer, controller etc that has a processor for analysing the received intensity signal. The processor may even be split over multiple units and/or may perform other control or analysis functions.

The invention claimed is:

1. A method of measuring at least one dimension of a non-toothed tool using a tool measurement apparatus comprising a transmitter and a receiver, the transmitter generating a beam of light that is directed towards the receiver, the receiver producing a received intensity signal related to the intensity of received light, the method comprising the steps of;

(i) rotating the non-toothed tool about its longitudinal axis whilst also moving the non-toothed tool relative to the light beam, and (ii) determining at least one dimension of the non-toothed tool by analysing variations in the received intensity signal that occur during step (i), wherein the signal analysis performed in step (ii) comprises determining when the received intensity signal has crossed a threshold for at least a defined duration, the defined duration being less than the time taken for one complete rotation of the non-toothed tool.

2. A method according to claim 1, wherein the non-toothed tool comprises a grinding tool.

3. A method according to claim 2, wherein the grinding tool is a diamond coated burr tool.

4. A method according to claim 3, wherein the defined duration is selected to allow the effect of any protruding clumps formed on the surface of the diamond coated burr tool to be substantially excluded from the at least one dimension that is determined in step (ii).

5. A method according to claim 1, wherein the defined duration is selected to detect concave defects of the non-toothed tool.

6. A method according to claim 1, wherein the defined duration is greater than 5% of the time taken for one rotation of the tool.

7. A method according to claim 1, wherein the defined duration is less than 95% of the time taken for one rotation of the tool.

8. A method according to claim 1, wherein the at least one dimension determined in step (ii) comprises a tool radius and/or a tool length.

9. A method according to claim 1, wherein step (ii) comprises establishing the total duration per revolution that the threshold remains crossed by identifying each time the received intensity signal crosses the threshold and determining therefrom when the total duration exceeds the defined duration.

10. A method according to claim 1, wherein step (ii) comprises determining whether the received intensity signal has continuously crossed the threshold for at least the defined duration.

11. A method according to claim 1, wherein step (i) comprises moving the rotating non-toothed tool into the light beam from a location away from the light beam.

12. A method according to claim 1, wherein step (i) comprises moving the rotating non-toothed tool out of the light beam.

13. A method according to claim 1, wherein the tool measurement apparatus is mounted to a machine tool having a spindle that holds the non-toothed tool, the machine tool being configured to provide the rotation and motion of the non-toothed tool of step (i).

14. A method according to claim 13, wherein step (ii) comprises the tool measurement apparatus issuing a trigger signal to the machine tool when the received intensity signal has crossed the threshold for the defined duration, the machine tool providing a measure of the position of the non-toothed tool on receipt of the trigger signal from which the at least one dimension of the non-toothed tool is derived.

15. A method according to claim 1, wherein the non-toothed tool is a grinding tool and the method comprises the additional step of using the grinding tool to grind a workpiece.

* * * * *